United States Patent
Wu et al.

(10) Patent No.: US 11,960,254 B1
(45) Date of Patent: Apr. 16, 2024

(54) ANOMALY DETECTION AND EVALUATION FOR SMART WATER SYSTEM MANAGEMENT

(71) Applicant: Bentley Systems, Incorporated, Exton, PA (US)

(72) Inventors: Zheng Yi Wu, Watertown, CT (US); Yekun He, Exton, PA (US)

(73) Assignee: Bentley Systems, Incorporated, Exton, PA (US)

( * ) Notice: Subject to any disclaimer, the term of this patent is extended or adjusted under 35 U.S.C. 154(b) by 140 days.

(21) Appl. No.: 17/693,208

(22) Filed: Mar. 11, 2022

(51) Int. Cl.
- *G05B 13/04* (2006.01)
- *G01F 1/88* (2006.01)
- *G05B 13/02* (2006.01)
- *G05B 23/02* (2006.01)
- *G06F 18/2321* (2023.01)

(52) U.S. Cl.
CPC ............ *G05B 13/042* (2013.01); *G01F 1/88* (2013.01); *G05B 13/0265* (2013.01); *G05B 13/048* (2013.01); *G05B 23/0221* (2013.01); *G06F 18/2321* (2023.01)

(58) Field of Classification Search
CPC ......................... G05B 13/042; G05B 13/0265; G05B 13/048; G05B 23/0221; G01F 1/88; G06F 18/2321
See application file for complete search history.

(56) References Cited

U.S. PATENT DOCUMENTS

| 8,175,859 | B1 | 5/2012 | Wu et al. |
| 8,635,051 | B1 | 1/2014 | Wu et al. |
| 10,060,835 | B1 | 8/2018 | Wu et al. |
| 2007/0093306 | A1 * | 4/2007 | Magee .................. B05B 17/08 472/128 |

(Continued)

FOREIGN PATENT DOCUMENTS

| CN | 109791637 A * | 5/2019 | .............. E03B 1/02 |
| WO | WO-2010131001 A1 * | 11/2010 | .............. G01M 3/26 |

OTHER PUBLICATIONS

Machine Translation of Shafiee in CN 109791637 A (Year: 2019).*

(Continued)

*Primary Examiner* — Mischita L Henson
(74) *Attorney, Agent, or Firm* — Cesari and McKenna, LLP; James A. Blanchette

(57) ABSTRACT

In various example embodiments, techniques are provided for efficient and reliable anomaly detection and evaluation in a water distribution system (e.g., a smart water distribution system) using both flow and pressure time series data from sensors of the system. The techniques may implement a multi-step workflow that involves decomposing the time series data to remove seasonality and rendering the time series data stationary, detecting outliers of the stationary time series data, classifying sensor events in response to flow or pressure of detected outliers exceeding high or low thresholds for at least a given number of time steps, classifying anomaly events by correlating one or more sensor events related to flow with one or more sensor events related (Continued)

to pressure or by clustering a plurality of sensor events in temporal proximity, and determining a quantitative score for each of the detected anomaly events that indicates a level of significance or importance.

24 Claims, 7 Drawing Sheets

(56) References Cited

U.S. PATENT DOCUMENTS

| | | | |
|---|---|---|---|
| 2017/0152648 A1* | 6/2017 | Hammond | G08B 21/182 |
| 2018/0181111 A1* | 6/2018 | Cussonneau | G06F 30/20 |
| 2019/0004484 A1* | 1/2019 | Cussonneau | G05B 23/0259 |
| 2020/0250306 A1* | 8/2020 | Pendyala | G06F 9/4498 |

OTHER PUBLICATIONS

T.K. Chan et al., Review of Current Technologies and Proposed Intelligent Methodologies for Water Distributed Network Leakage Detection, Dec. 6, 2018, IEEE Access, vol. 6, pp. 78846-78867, DOI 10.1109/Access.2018.2885444 (Year: 2018).*
Cleveland, Robert B., et al., "STL: A Seasonal-Trend Decomposition Procedure Based on Loess," Statistics Sweden, Journal of Official Statistics, vol. 6, No. 1, Mar. 1990, pp. 3-73.
Hochenbaum, Jordan, et al., "Automatic Anomaly Detection in the Cloud Via Statistical Learning," arXiv, arXiv:1704.07706v1 [cs.LG], Apr. 24, 2017, pp. 1-13.
Hutton, Christopher, et al., "Real-Time Burst Detection in Water Distribution Systems Using a Bayesian Demand Forecasting Methodology," Elsevier Ltd., Elsevier, ScienceDirect, Procedia Engineering, 13$^{th}$ Computer Control for Water Industry Conference, CCWI 2015, vol. 119, Dec. 2015, pp. 13-18.
Jung, Donghwi, et al., "Water Distribution System Burst Detection Using a Nonlinear Kalman Filter," American Society of Civil Engineers, ASCE, Journal of Water Resources Planning and Management, vol. 141, No. 5, May 2015, pp. 1-13.
Li, Qiao, et al., "Evolutionary Deep Learning with Extended Kalman Filter for Effective Prediction Modeling and Efficient Data Assimilation," American Society of Civil Engineers, ASCE, Journal of Computing in Civil Engineering, vol. 33, No. 3, May 2019, pp. 1-12.
Mounce, S.R., et al., "Development and Verification of an Online Artificial Intelligence System for Detection of Bursts and Other Abnormal Flows," American Society of Civil Engineers, ASCE, Journal of Water Resources Planning and Management, vol. 136, No. 3, May 1, 2010, pp. 309-318.
Mounce, Stephen R., et al., "Novelty Detection for Time Series Data Analysis in Water Distribution Systems Using Support Vector Machines," IWA Publishing, Journal of Hydroinformatics, vol. 13, No. 4, Nov. 6, 2010, pp. 672-686.
Mounce, S.R., et al., "Pattern Matching and Associative Artificial Neural Networks for Water Distribution System Time Series Data Analysis," IWA Publishing, Journal of Hydroinformatics, vol. 16, No. 3, Oct. 8, 2013, pp. 617-632.
Mounce, Stephen R., et al., "Sensor-Fusion of Hydraulic Data for Burst Detection and Location in a Treated Water Distribution System," Elsevier B.V., Elsevier, Information Fusion, vol. 4, Sep. 2003, pp. 217-229.
Mourad, M., et al., "A Method for Automatic Validation of Long Time Series of Data in Urban Hydrology," IWA Publishing, Water Science and Technology, vol. 45, No. 4-5, Feb. 2002, pp. 262-270.
Rodriguez, Alex, et al., "Clustering by Fast Search and Find of Density Peaks," Machine Learning, Science, vol. 344, Issue 6191, Jun. 27, 2014, pp. 1492-1496.
Romano, Michele, et al., "Automated Detection of Pipe Bursts and other Events in Water Distribution Systems," Manuscript Draft, Technical Paper, American Society of Civil Engineers, ASCE, Journal of Water Resources Planning and Management, Apr. 2014, pp. 1-36.
Romano, M., et al., "Evolutionary Algorithm and Expectation Maximization Strategies for Improved Detection of Pipe Bursts and Other Events in Water Distribution Systems," American Society of Civil Engineers, ASCE, Journal of Water Resources Planning and Management, vol. 140, No. 5, May 1, 2014, pp. 572-584.
Tao, Tao, et al., "Burst Detection Using an Artificial Immune Network in Water-Distribution Systems," American Society of Civil Engineers, ASCE, Journal of Water Resources Planning and Management, vol. 140, No. 10, Oct. 2014, pp. 1-10.
U.S. Appl. No. 16/796,462, filed Feb. 20, 2020 by Zheng Yi Wu, et al. for Evolutionary Deep Learning With Extended Kalman Filter for Modeling and Data Assimilation, pp. 1-40.
Wen, Qingsong, et al., "RobustSTL: A Robust Seasonal-Trend Decomposition Algorithm for Long Time Series," arXiv, arXiv:1812.01767v1 [cs.LG], Dec. 5, 2018, pp. 1-9.
Wu, Yipeng, et al., "A Review of Data-Driven Approaches for Burst Detection in Water Distribution Systems," Informa UK limited, Taylor & Francis, Taylor & Francis Group, Urban Water Journal, vol. 14, No. 9, Feb. 10, 2017, pp. 972-983.
Wu, Yipeng, et al., "Distance-Based Burst Detection Using Multiple Pressure Sensors in District Metering Areas," American Society of Civil Engineers, ASCE, Journal of Water Resources Planning and Management, vol. 144, No. 11, Nov. 2018, pp. 1-6.
Wu, Yipeng, et al., "Using Correlation Between Data from Multiple Monitoring Sensors to Detect Bursts in Water Distribution Systems," American Society of Civil Engineers, ASCE, Journal of Water Resources Planning and Management, vol. 144, No. 2, Feb. 2018, pp. 1-10.
Wu, Zheng Yi, et al., "Comparing Deep Learning with Statistical Control Methods for Anomaly Detection," 1$^{st}$ International WDSA/CCWI 2018 Joint Conference, Kingston, Ontario, Canada, Jul. 23-25, 2018, pp. 1-8.
Wu, Zheng Yi, et al., "Pressure-Dependent Leak Detection Model and Its Application to a District Water System," American Society of Civil Engineers, ASCE, Journal of Water Resources Planning and Management, vol. 136, No. 1, Jan. 1, 2010, pp. 116-128.
Wu, Zheng Yi, "Unified Parameter Optimisation Approach for Leakage Detection and Extended-Period Simulation Model Calibration," Taylor & Francis, Taylor & Francis Group, Urban Water Journal, vol. 6, No. 1, Apr. 7, 2009, pp. 53-67.
Ye, Guoliang, et al., "Weighted Least Squares with Expectation-Maximization Algorithm for Burst Detection in U.K. Water Distribution Systems," American Society of Civil Engineers, ASCE, Journal of Water Resources Planning and Management, vol. 140, No. 4, Apr. 1, 2014, pp. 417-424.
Dziri, Jalal, et al., "Decision Tree and Support Vector Machine for Anomaly Detection in Water Distribution Networks," IEEE, 2020 International Wireless Communications and Mobile Computing (IWCMC), Limassol, Cyprus, Jun. 15-19, 2020, pp. 1320-1323.
Laucelli, Daniele, et al., "Detecting Anomalies in Water Distribution Networks Using EPR Modelling Paradigm," IWA Publishing, Journal of Hydroinformatics, available online on Dec. 12, 2015, vol. 18, No. 3, published on May 11, 2016, pp. 409-427.
U.S. Appl. No. 18/098,419, filed Jan. 18, 2023 by Meng Xue, et al. for Systems, Methods, and Media for Near Real-Time Anomaly Event Detection and Classification With Trend Change Detection for Smart Water Grid Operation Management, pp. 1-43.
Zhang, Qingzhou, et al., "Leakage Zone Identification in Large-Scale Water Distribution \Systems Using Multiclass Support Vector Machines," American Society of Civil Engineers, ASCE, Journal of Water Resources Planning and Management, vol. 142, Issue 11, Jun. 14, 2016, pp. 1-15.

* cited by examiner

ANOMALY DETECTION AND EVALUATION FOR SMART WATER SYSTEM MANAGEMENT

BACKGROUND

Technical Field

The present disclosure relates generally to monitoring water distribution systems and more specifically to techniques for anomaly detection and evaluation in smart water distribution systems.

Background Information

Water distribution systems have traditionally been monitored using supervisory control and data acquisition (SCADA) technology, which monitors key control devices and facilities. In such SCADA deployments, only a relatively limited amount of flow data was typical recorded, typically at the inlet of the system or district meter area (DMA). More recently, with ubiquitous Internet connectivity and the widespread availability of low-cost sensors, large numbers of smart meters, sensors and data loggers have been deployed in many water distributions systems. Such smart water distribution systems often also collect pressure measurements at locations within the water distribution system, for example, at individual pipes, junctions, tanks, etc. A goal of smart water distribution systems is to enable better detection of anomaly events that may lead to water service disruptions, so that actions can be taken to mitigate impact.

The term "anomaly event" refers to a deviation from normal or intended operation of a water distribution system. In general, anomaly events may be categorized into operation-related anomaly events and cyber security-related anomaly events. Examples of operation-related anomaly events pipe bursts (e.g., with overflow into streets or existing hidden underground) and unauthorized (e.g., illegal) water usage. Examples of cyber security-related anomaly events include unauthorized activations or deactivations of devices or facilities (e.g., valves, pumps, water treatment plants, etc.) and unauthorized changes to the functions of such devices or facilities. If anomaly events can be efficiently and reliable detected, then appropriate repair and maintenance personnel may be effectively dispatched.

In traditional SCADA deployments, where only flow data is typical recorded at the inlet of the system or DMA, anomaly event detection often involved a comparison of average flow rate at minimum night flow (MNF) hours (e.g., 2 to 4 AM). If the most recent rate at MNF is significantly greater than the previous days, it may be assumed an anomaly event occurred. MNF methods are simple and easy to implement but cannot make use of the whole dataset provided by more modern smart water distribution systems at all hours (e.g., non-MNF hours).

In more modern smart water distribution systems, where pressure data at locations within the water distribution system is typically also recorded, several types of approaches have been, or potentially could be, attempted to detect anomaly events, including prediction classification (PC) approaches, clustering algorithms (CA) approaches and statistical process control (SPC) methods. However, each of these approaches has a number of shortcomings.

Existing PC approaches generally involve constructing a prediction model using historical data. Once established, the prediction model is used to forecast flow or pressure. If the prediction is out of predefined bounds, an anomaly event is concluded to have occurred. However, to be effective, PC approaches generally require large amounts of historical data to establish and train the prediction model and such training may be computationally expensive (in terms of memory and processor resources). This may prove a burden in real-world deployments, where such historical data may not be readily available and more efficient approaches are desired.

Existing CA approaches generally construct a classifier by using data features carefully selected and processed or automatically learned from a historical dataset. After being constructed, the classifier may be applied to new data for anomaly detection. However, existing CA approaches may not be entirely reliable, tending to produce false alarms. To be usable in in real-world deployments, they may need to be deployed in conjunction with sophisticated alarm rules designed to screen out such false alarms, which may impose burdens.

Existing SPC methods generally define a control chart that helps to detect an unusual event such as a very high or low observation compared with 'normal' process performance. However, existing SPC methods typically require a number of assumptions and have various limitations that may be problematic for real-world systems. For example, existing SPC methods are typically limited to stationary time series data, yet in most real-world systems flows and pressures vary periodically (e.g., daily, weekly, monthly, etc.). Various attempts to address the periodicity of typical real-world flows and pressures have introduced spurious anomalies (i.e., anomalies that are not in the original time series data) which may render any eventual anomaly detection unreliable.

A further general limitation of many existing PC approaches, CA approaches and SPC methods is that they usually fail to effectively quantitatively evaluate anomaly events into different levels of significance or importance. Without quantitative evaluation, it may be unclear whether an event requires an immediate dispatch of personnel or can be investigated in the normal course of maintenance (or potentially even ignored).

Accordingly, there is a need for more efficient and reliable techniques for anomaly detection and evaluation in water distribution systems. It would be desirable if such techniques could address some or all of the shortcomings of prior approaches, which have hindered their deployment with real-world smart water distribution systems.

SUMMARY

In various example embodiments, techniques are provided for efficient and reliable anomaly detection and evaluation in a water distribution system (e.g., a smart water distribution system) using both flow and pressure time series data from sensors of the system. The techniques may implement a multi-step workflow that involves decomposing the time series data to remove seasonality and rendering the time series data stationary (e.g., using an improved Seasonal-Trend decomposition using LOESS (STL) algorithm), detecting outliers of the stationary time series data, classifying sensor events in response to flow or pressure of detected outliers exceeding high or low thresholds for at least a given number of time steps, classifying anomaly events by correlating one or more sensor events related to flow with one or more sensor events related to pressure or by clustering a plurality of sensor events in temporal proximity, and determining a quantitative score for each of the detected anomaly events that indicates a level of significance or importance.

Such a workflow may intrinsically address, or may include features that address, many of the shortcomings of prior approaches. In contrast to existing PC approaches, it may not require large amounts of historical data and may avoid extensive, computationally expensive training. In contrast to existing CA approaches, it may produce less false positives, and may not require sophisticated alarm rules to screen out false alarms. In contrast to existing SPC approaches, the improved decomposition utilized may introduce fewer spurious anomalies, rendering eventual anomaly detection more reliable. Finally, in contrast to various existing approaches, it may provide effective quantitative evaluation to enable maintenance and repair personnel to be effectively deployed.

It should be understood that a variety of additional features and alternative embodiments may be implemented other than those example embodiments discussed in this Summary. This Summary is intended simply as a brief introduction to the reader for the further description which follows and does not indicate or imply that the example embodiments mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
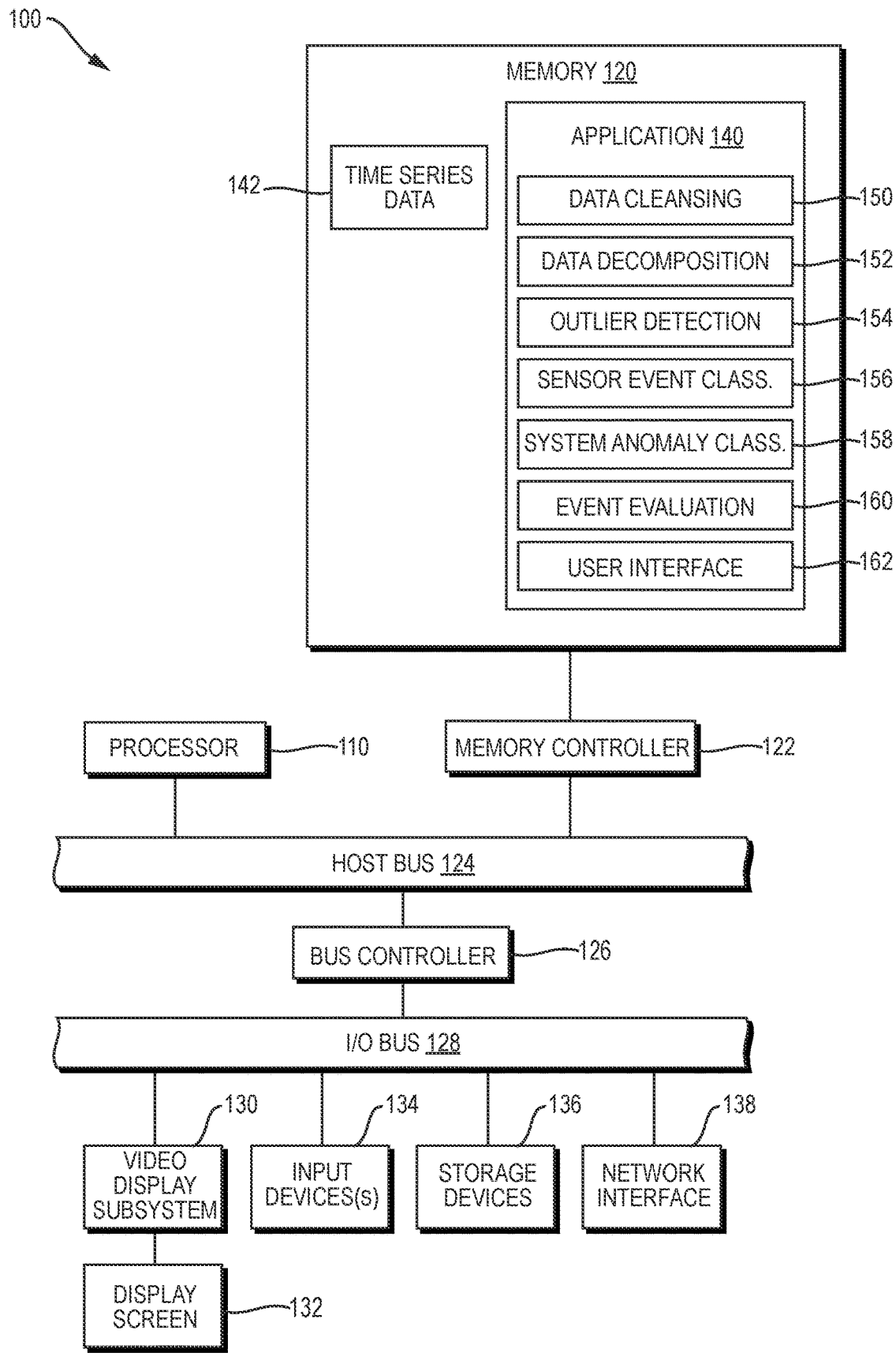
FIG. 1 is a block diagram of an example computing device that may be used with the present techniques.

FIG. 1 is a block diagram of an example computing device 100 that may be used with the present techniques. The computing device 100 includes at least one processor 110 coupled to a host bus 124. The processor 110 may be any of a variety of commercially available processors. A memory 120, such as a Random-Access Memory (RAM), is also coupled to the host bus 124 via a memory controller 122. When in operation, the memory 120 stores executable instructions and data that are provided to the processor 110. An input/output (I/O) bus 128 is accessible to the host bust 124 via a bus controller 126. A variety of additional components are coupled to the I/O bus 128. For example, a video display subsystem 130 is coupled to the I/O bus 128. The video display subsystem 130 may include a display screen 132 and hardware to drive the display screen. At least one input device 134, such as a keyboard, a touch sensor, a touchpad, a mouse, etc., is also coupled to the I/O bus 128. Storage device(s) 136, such as a hard disk drive, a solid-state drive, or other type of persistent data store, are further attached, and may persistently store the executable instructions and data, which are loaded into the memory 120 when needed. Still further, a network interface 138 is coupled to the I/O bus 128. The network interface 138 enables communication over a computer network, such as the Internet, between the computing device 100 and other devices, using any of a number of well-known networking protocols. Such communication may enable collaborative, distributed, or remote computing with functionality spread across multiple devices.

Working together the components of the computing device 100 (and other devices in the case of collaborative, distributed, or remote computing) may execute instructions for a software application 140 that is adapted to efficiently and reliably detect and evaluate anomaly events in a water distribution system (e.g., a smart water distribution system). The application 140 may utilize time series data 142 that includes both flow and pressure measurements captured at regular intervals (i.e., time steps) by sensors of the water distribution system. Preferably the flow and pressure measurements include measurements within the water distribution system, for example, at individual pipes, junctions, tanks, etc., in addition the inlet of the system or DMA. The application 140 may include a number of software modules (or simply "modules", including a data cleansing module 150, a data decomposition module 152, a outlier detection module 154, a sensor event classification module 156, a system anomaly classification module 158 an event evaluation module 160, and a user interface module 162, the operation of each which is discussed in more detail below.

The application 140 and modules 152-162 may work together to implement a workflow. In general, the workflow may begin by cleaning the time series data 142 to correct data errors. The cleaned time series data may then be decomposed to ensure data stationarity, which allows outliers to be detected using data-driven analytics. The detected outliers may be classified first into sensor events, and then the sensor events used to classify anomaly events for the water distribution system. Each of the anomaly events may then be quantitatively evaluated to categorize its importance for investigation by field personnel. Results may be provided by display in a user interface, storage to memory/storage devices, or by other means.

Figure 2:
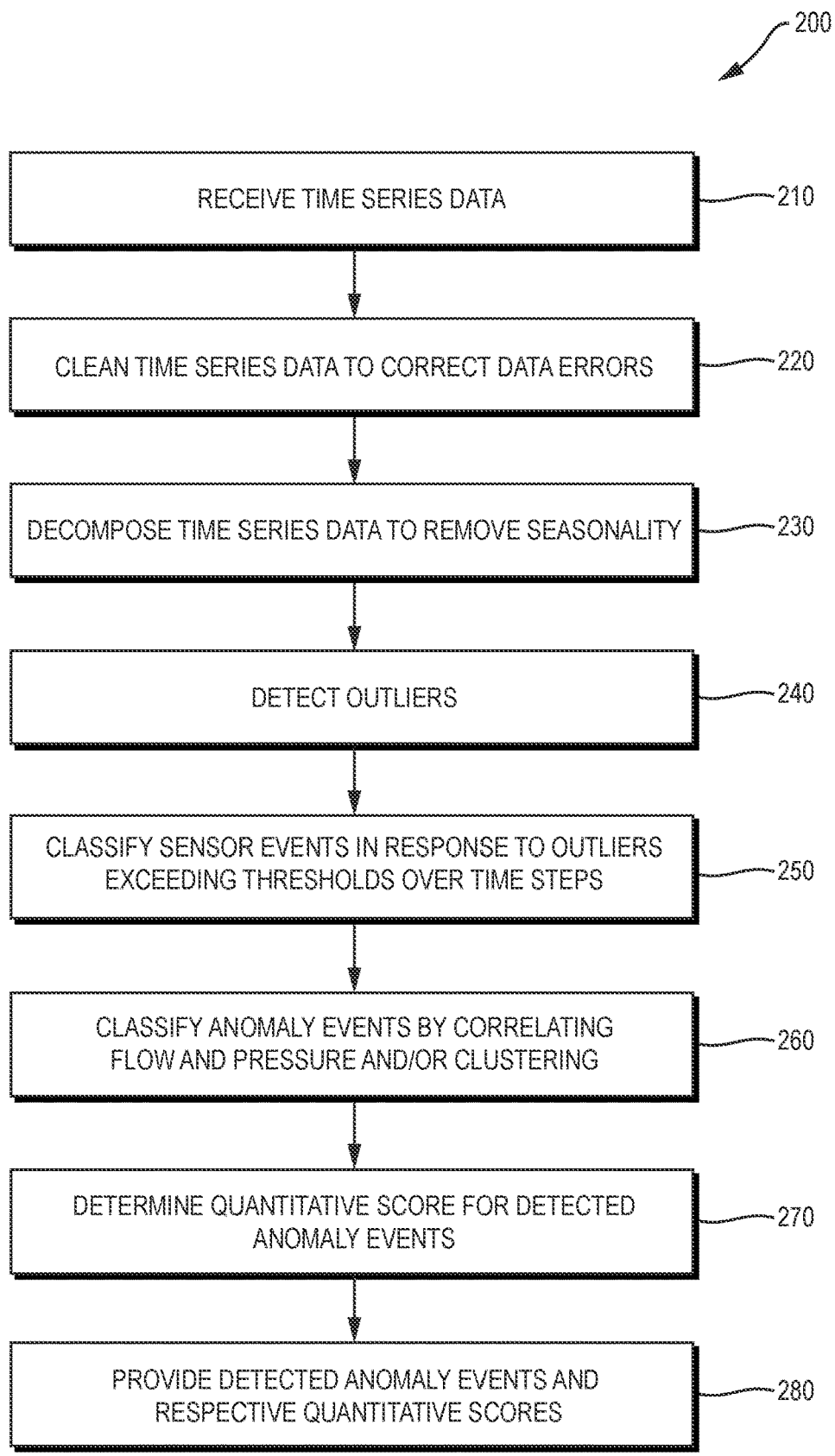
FIG. 2 is a flow diagram of an example workflow that may be performed to efficiently and reliably detect and evaluate anomaly events in a water distribution system.

Looking to this general workflow in more detail, FIG. 2 is a flow diagram of an example workflow 200 that may be performed by the application 140 and modules 152-162 to efficiently and reliably detect and evaluate anomaly events in a water distribution system. At workflow step 210, the application 140 receives time series data 142 that includes both flow and pressure measurements captured at time steps. The time series data 142 may be fully pre-recorded data, or preferably built in real-time to include substantially current data for the latest time step.

At workflow step 220, the data cleansing module 150 of the application 140 cleans the time series data 142 to correct data errors. By its nature, raw date captured by sensors in a water distribution network typically includes a number of data errors that if unaddressed could impair effective detection and evaluation of anomaly events. These data error may include missing time steps, duplicate time steps, irregular time steps and sensor failure time steps. The data cleansing module 150 may address each data error type in a different manner using user-configurable parameters. The user-configurable parameters may include a maximum allowable number of missing time steps, a minimum consecutive steps parameter, a minimum value parameter, and a maximum value parameters, the functions of which are discussed below. Such parameters may be configured using input provided via the user interface module 162 or in other ways.

Figure 3A:
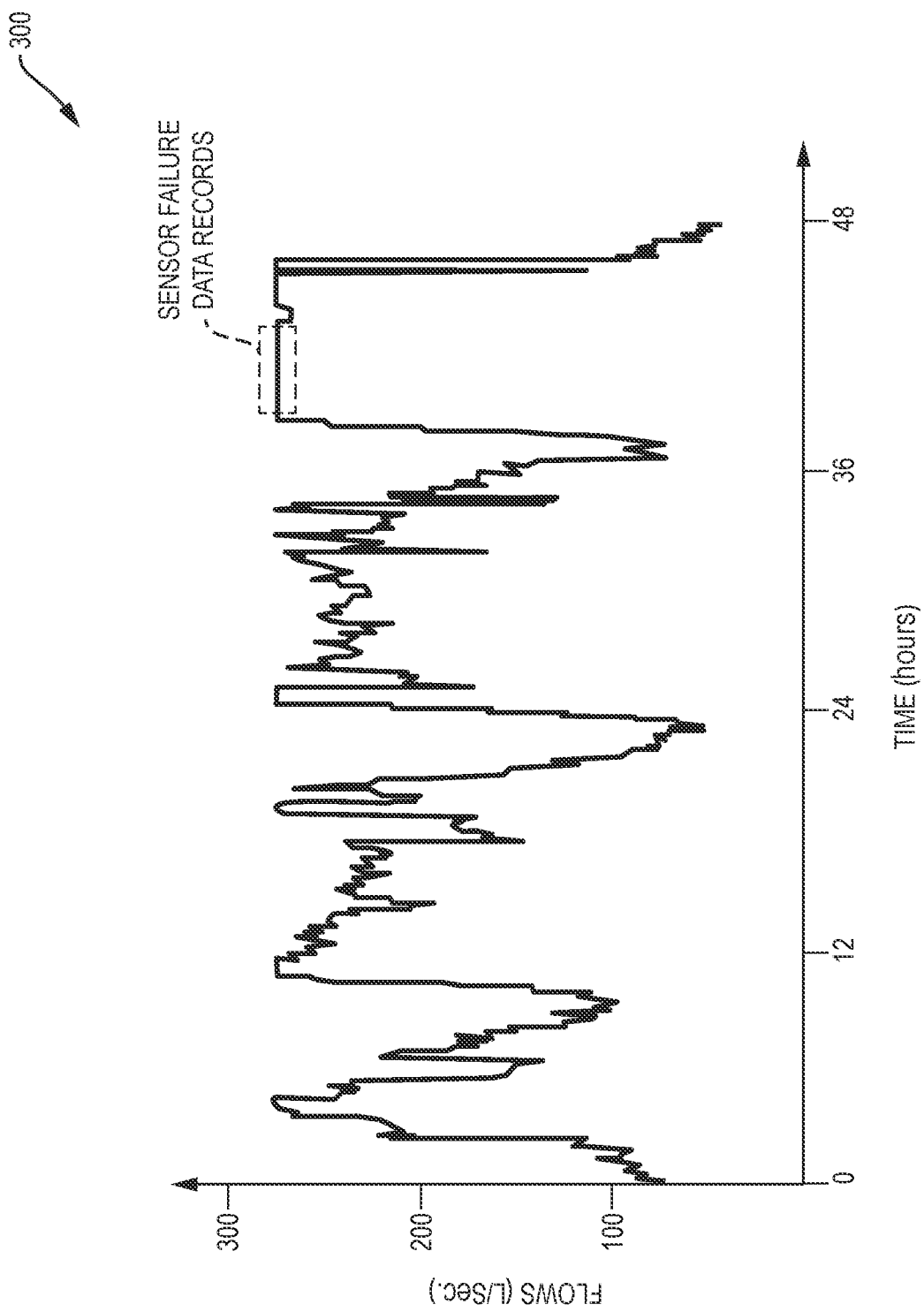
FIG. 3A is a plot of example time series data (here pressure data over a one-day period) that has missing data records.

Missing time steps refers to a number of data records (i.e., flow and/or pressure measurements) in a period (e.g., in one day) is less than the number of data records expected for the complete period. FIG. 3A is a plot 300 of example time series data (here pressure data over a one-day period) that has missing data records. The data cleansing module 150 may address missing data records by filling in the missing data with values from the time step from a last period (e.g., a last day) if the number of missing data records is less than the user-configurable maximum allowable number of missing time steps parameter. Otherwise, the data cleansing module 150 may remove the data records for the whole period (e.g., whole day) in which there is missing data records from the time series data 142.

Duplicate time steps refers to a data error where there are more than one data record (i.e., flow and/or pressure measurement) with the same timestamp when only a single data record is expected. The data cleansing module 150 may address missing data records by checking whether each of the data records for the same time step have the same flow and pressure values, and, if they are the same, deleting all but one data record. If their values are different, the data cleansing module 150 may average values of the data records and store a single data record for the time step with the averaged values.

Irregular time steps refers to a data error where there is one or more data records (i.e., flow and/or pressure measurements) with a timestamp that does not coincide with an expected interval of the time series data. Time series data is usually recorded at a fixed time interval (e.g., every 5 minutes). If there are any data records with timestamps that do not align with this interval, they may be considered to have an irregular time step. The data cleansing module 150 may address irregular time steps by generating a data record at each expected time step where it is missing by interpolating flow and pressure values from data records at adjacent irregular time steps.

Figure 3B:
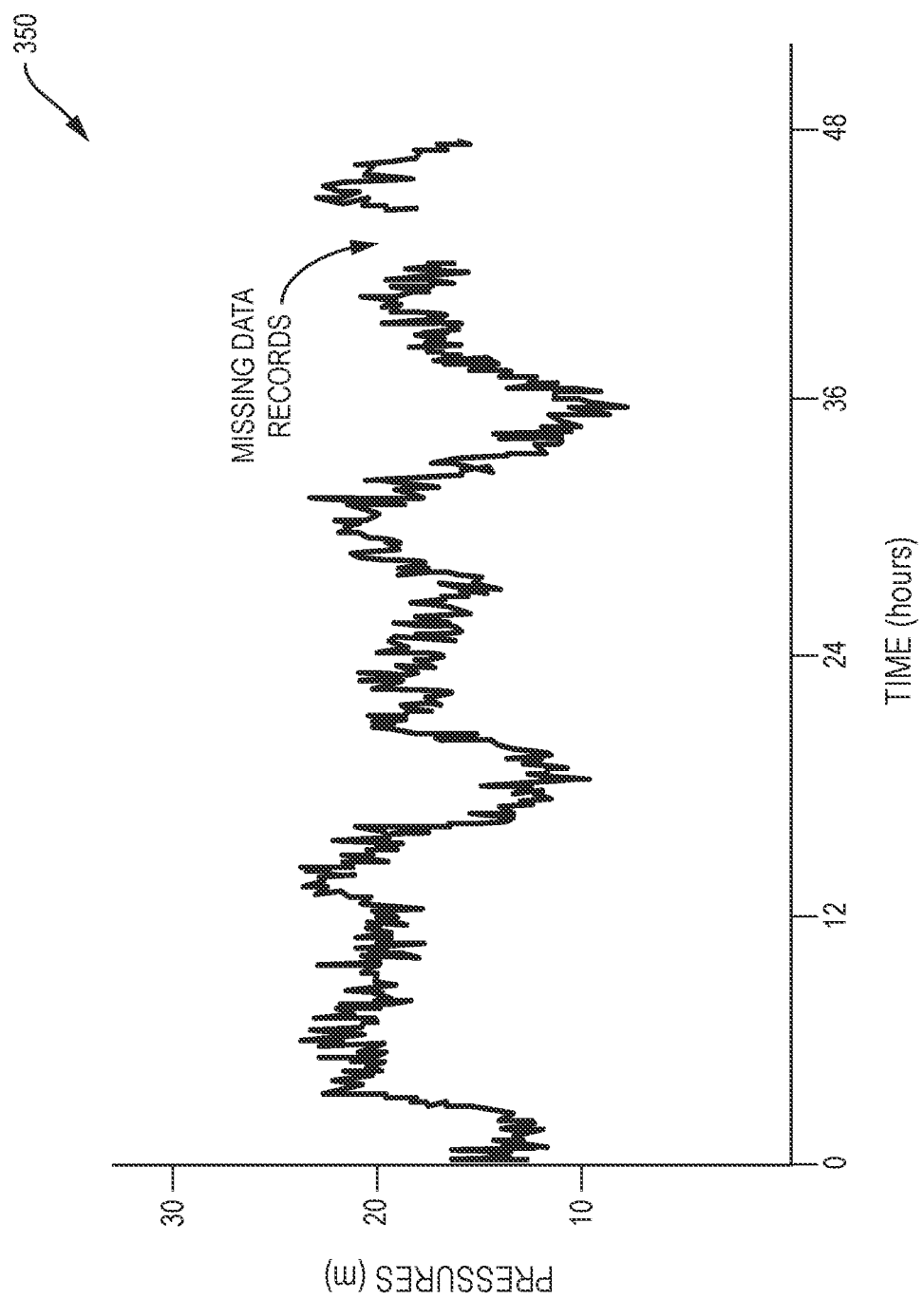
FIG. 3B is a plot of example time series data (here flow data over a one-day period) that has sensor failure time steps where flow values are constant over an extended period.

Sensor failure time steps refers to a data error where a failed sensor in the water distribution network causes an erroneous data record (i.e., flow and/or pressure measurement). The erroneous data record may have an extremely large value, an extremely small value, or a value that "locked" to a constant over an extended period of time, where values of such size or consistency are unlikely to naturally occur. FIG. 3B is a plot 350 of example time series data (here flow data over a one-day period) that has sensor failure time steps where flow measurements are constant over an extended period. The data cleansing module 150 may address sensor failure time steps by comparing data records to the minimum value parameters and the maximum value parameters, and eliminating those that exceed the bounds. The data cleansing module 150 may further compare consecutive data records (i.e., flow and/or pressure measurements) and if their values remain constant for more than the minimum consecutive steps parameter, remove these data records. The removed data records may be replaced with data records from the same time step from the last period (e.g., a last day).

At workflow step 230, the data decomposition module 152 of the application 140 decomposes the time series data 142 to remove seasonality and render the data records (i.e., flow and/or pressure measurements) stationary Seasonality refers to the presence of variations that occur at specific regular intervals, for example, daily, weekly, or monthly, etc. Real-world flow and pressure measurements often contains seasonality and therefore the mean and the variance of the dataset changes over time (i.e., is non--stationary). Operation of workflow step 230 may remove such changes over time (i.e making the time series data 142 stationary).

The data decomposition module 152 may decompose a series of original values (O) in the time series data 142 into three series, including a seasonal component (S), a trend component (T) and a remainder component (R), which may be represented as:

$$O=R+S+T.$$

Figure 4:
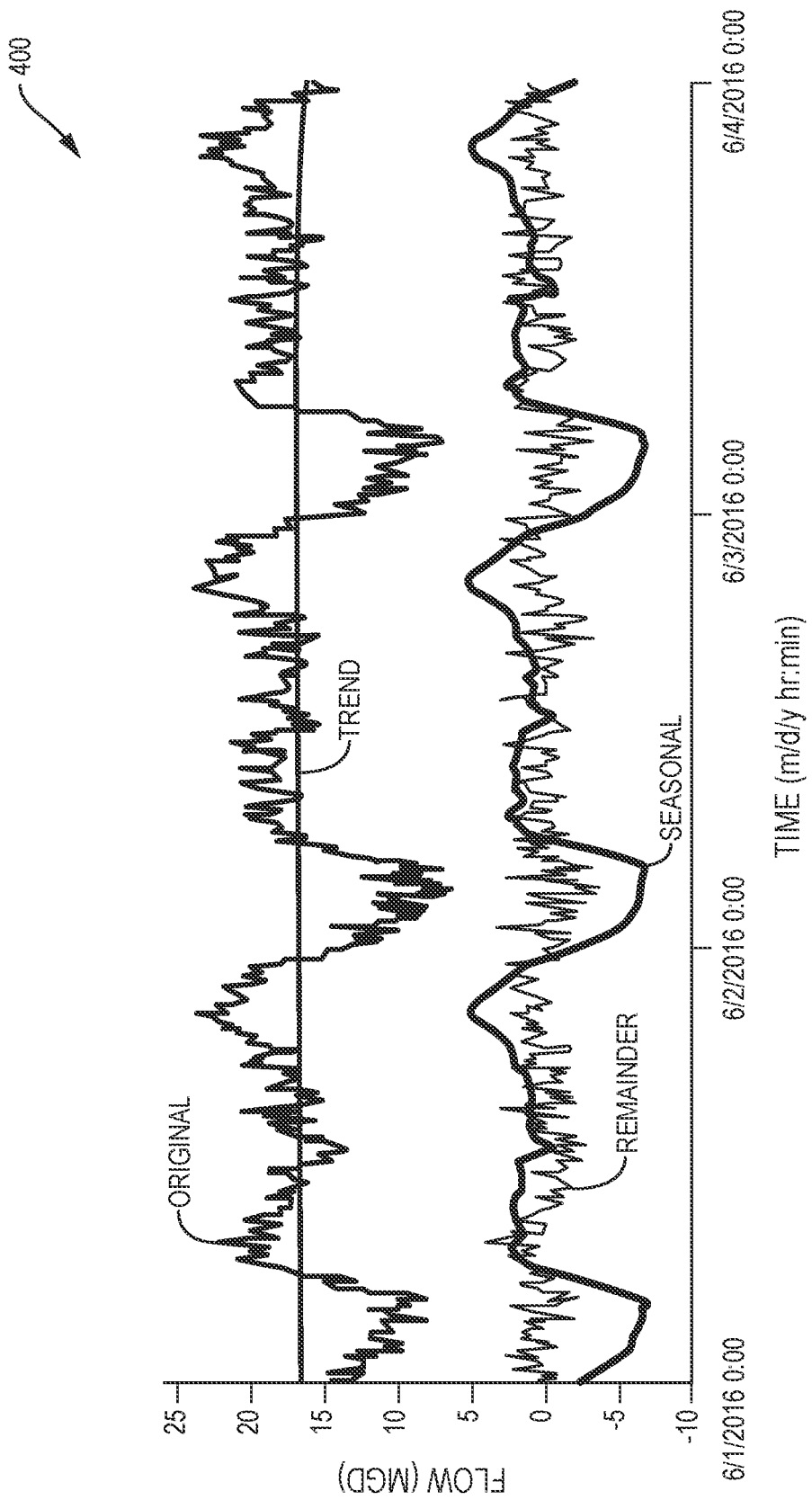
FIG. 4 is a graph of an example decomposition of flow measurements that may be performed as a part of the workflow of FIG. 2.

FIG. 4 is a graph 400 of an example decomposition of flow measurements that may be performed as a part of workflow step 230 of FIG. 2.

A variety of different decomposition algorithms may be used by the data decomposition module 152. One example type of decomposition algorithm that may be used is an autoregressive integrated moving average (ARIMA) algorithm. Alternatively, an algorithm based on STL may be employed. STL algorithms may employ locally weighted scatterplot smoothing to smooth data using a weight $v_i(x)$ for any $x_i$ in the neighborhood of x, given as:

$$v_i(x) = W\left(\frac{|x_i - x|}{\lambda_q(x)}\right),$$

where $$W(u) = \begin{cases} (1-u^3)^3, & 0 \le u \le 1 \\ 0, & u \le 1 \end{cases}$$

where $\lambda_q(x)$ is distance of the $q^{th}$ farthest $x_i$ from x and W is a tricube function. Thus, the closer $x_i$ to x the greater the weight. Smoothing may be applied repeatedly to remove various seasonal components. This may result in a stationary time series, given as:

$$R=O-S-T.$$

In some cases, STL algorithms may yield spurious anomalies (i.e., anomalies not in the original time series data) in the residual component. In one embodiment, the data decomposition module 152 may employ an improved STL algorithm for decomposition, which replaces the trend value with a median value (M) for the time series data 142. An improved STL algorithm may be given as:

$$R=O-S-M.$$

Figure 5:
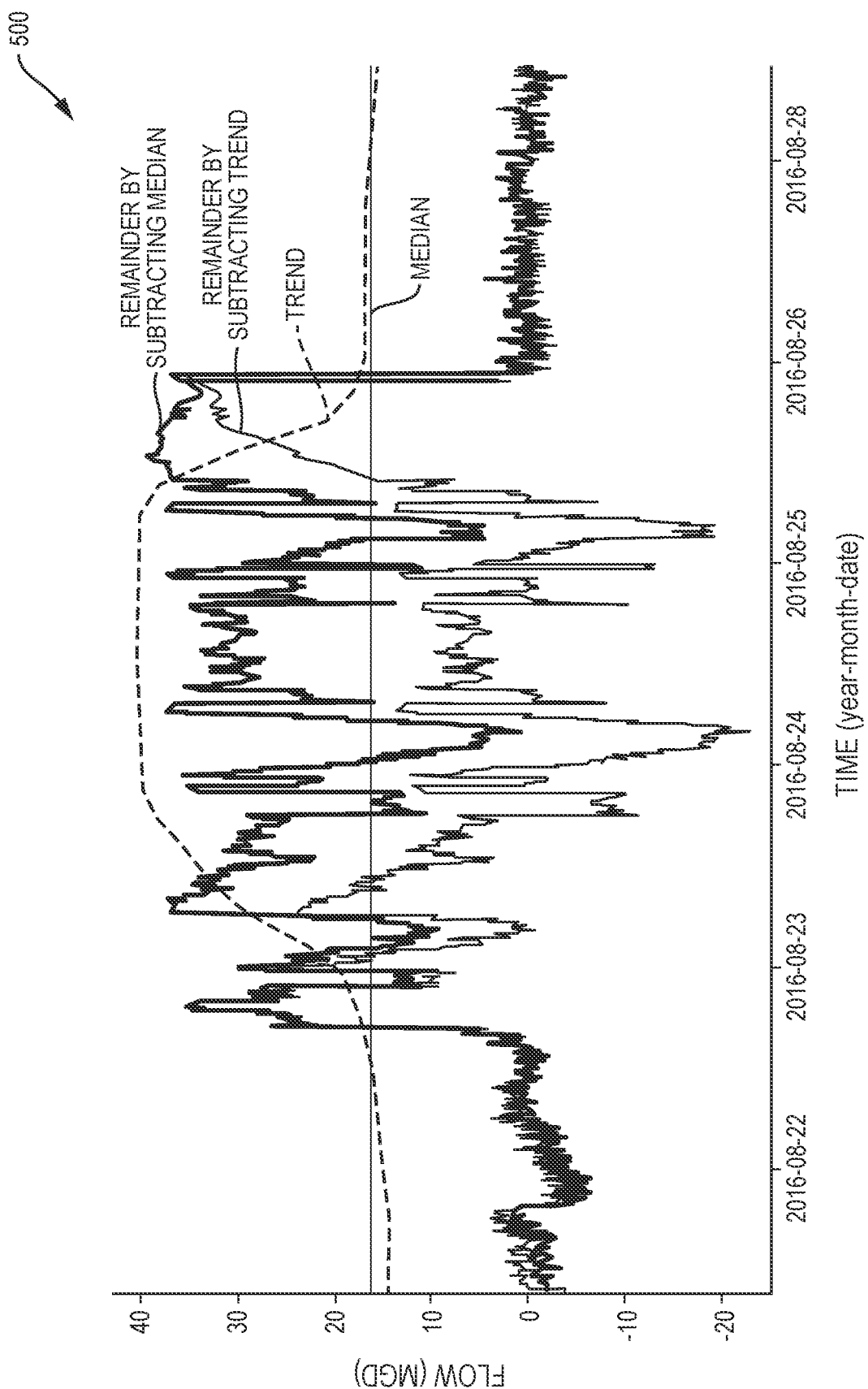
FIG. 5 is a plot showing an example of an improved STL algorithm contrasted with a regular STL algorithm for use in decomposing time series data (here flow measurements) to remove seasonality.

FIG. 5 is a plot 500 showing an example of an improved STL algorithm contrasted with a regular STL algorithm for use in decomposing time series data (here flow measurements) to remove seasonality. As can be seen, with a regular STL algorithm that subtracts a trend component, a breakout (e.g., a pulse) is observed in the trend component leading to spurious anomalies in the remainder component. However, with the improved STL algorithm that subtracts a median, the remainder component does not exhibit spurious anomalies.

At workflow step 240, the outlier detection module 154 of the application 140 detecting outliers of the now-stationary time series data 142 using one or more statistical process control (SPC) algorithms or machine learning. In one embodiment, a combination of four SPC algorithms is employed including an x-bar algorithm, a cumulative sum control chart (CUSUM) algorithm, an exponentially weighted moving average (EWMA) algorithm, and a seasonal hybrid-extreme student deviate (SH-ESD).

An x-bar algorithm is an algorithm typically used to monitor a variable attribute in data. It assumes that the attribute to be monitored can be modeled by a normally distributed random variable. An upper control limit (UCL) and a lower control limit (LCL) of an x-bar may be defined as:

$$UCL = \mu + \rho \times \sigma$$

$$LCL = \mu - \rho \times \sigma$$

where $\mu$ is the sample mean, $\sigma$ is standard deviation, and $\rho$ is a confidence level coefficient (e.g., a $\rho$ value of 1, 2 and 3 may approximately correspond to a confidence level of 68%, 95%, and 99.7% respectively).

A CUSUM algorithm is an algorithm used for monitoring small shifts in data. It involves the calculation of a cumulative sum and comparison of the cumulative sum to a threshold value. When the value of the cumulative sum exceeds the threshold value, a shift is identified. A CUSUM algorithm may calculate a high side cumulative sum (SH) and a low side cumulative sum (SL) of data as follows:

$$SH(0) = SL(0) = 0$$

$$SH(j) = \text{Max}[0, SH(j-1) + X_j - \mu - 0.5\sigma]$$

$$SL(j) = \text{Min}[0, SL(j-1) + X_j \mp 0.5\sigma]$$

where $X_j$ is the mean of each successive subgroup j of the data.

An EWMA algorithm is an algorithm used for detecting small shifts in a process mean. It weights samples in geometrically decreasing order so that the most recent samples are weighted highly while the most distant samples contribute very little. It monitors an EQMA value $Z_j$ instead of the original data values using smoothing operations, that may be given as:

$$Z_j = \lambda X_j + (1-\lambda) Z_{j-1}$$

where $\lambda$ is a configured smoothing constant. An upper control limit UCL and lower is control limit LCL may be specified as:

$$UCL_j = \mu + 3\sigma \sqrt{\frac{\lambda}{(2-\lambda)}[1-(1-\lambda)^{2j}]}$$

$$LCL_j = \mu - 3\sigma \sqrt{\frac{\lambda}{(2-\lambda)}[1-(1-\lambda)^{2j}]}$$

An SH-ESD algorithm is an algorithm that detects outliers within a univariant set of data. It assumes that the underlying data follows a normal distribution. It is based on the extreme student deviate (ESD) test, which identifies anomalies by their distance from a mean value. If one data value deviates greatly from the mean value, it is very likely to be an outlier. ESD may compute test statistics $C_k$ for the k most extreme values in a dataset, as:

$$C_k = \frac{\text{Max}_k |x_k - \bar{x}|}{\sigma}$$

The test statistics are then compared with a critical value $\gamma_k$ given as:

$$\gamma_k = \frac{(N-k) t_{p, N-k-1}}{\sqrt{(N-k-1+t^2_{p,N-k-1})(N-k+1)}}$$

where k is the number of most extreme values in the data, N is the total number of data values and $t_{p,N-k-1}$ is the upper critical value of the t-distribution test at p percentage point with (N−k−1) degrees of freedom. If a value is determined to indeed be anomalous based on the comparison, it is removed from the data, and the critical value is recalculated for the remaining data.

At workflow step 250, the sensor event classification module 156 of the application 140, classifies sensor events in response to flow or pressure of detected outliers exceeding high or low thresholds for at least a given number of time steps. The term "sensor event" refers to an anomalous event detected by an individual sensor. A sensor event may be the result of normal system operation (e.g., a result of operation of control facilities such as valves, pumps, etc.) or may be part of a true anomaly event, where there is a deviation from the normal or intended operation of the water distribution system.

As part of workflow step 250, the sensor event classification module 156 may identify high flow (HF) sensor events and high pressure (HP) sensor events by comparing flow and pressure outliers, respectively, to high flow and high-pressure thresholds, and may identify low flow (LF) sensor events and low pressure (LP) sensor events by comparing flow and pressure outliers, respectively, to low flow and low-pressure thresholds. Outliers may be classified as a sensor event if a temporal proximity criteria is met, for example, that consecutive outliers occur over at least a minimum number of time steps (e.g., occur over 6 consecutive time steps yielding 30 minutes with 5-minute time steps). This may exclude isolated outliers. Adjacent sensor events may be combined into one sensor event if a time gap between the two sensor events is less than a predetermined time gap (e.g., 5 minutes). This may prevent one actual sensor event from being divided into multiple sensor events.

At workflow step 260, the system anomaly classification module 158 of the application 140 classifies anomaly events by correlating one or more sensor events related to flow (e.g., HF sensor events) with one or more sensor events related to pressure (e.g., LF sensor events) or clustering a plurality of sensor events (e.g., including HF sensor events and LF sensor events) in temporal proximity.

It should be remembered that a sensor event identified by only one flow sensor, or only one pressure sensor, may not necessarily mean there is a true anomaly event. A true anomaly event is highly likely to cause an increased system inflow and pressure drop in some portion of the water distribution system, which typically will be detected by multiple sensors, including both flow sensors and pressure sensors, in that portion. Using this, the system anomaly classification module 158 may classifies anomaly events by correlating one or more sensor events related to flow (e.g., HF sensor events) with one or more sensor events related to pressure (e.g., LP sensor events) within a same time window, and by clustering HF sensor events and/or LP sensor events that occur within temporal proximity.

Figure 6:
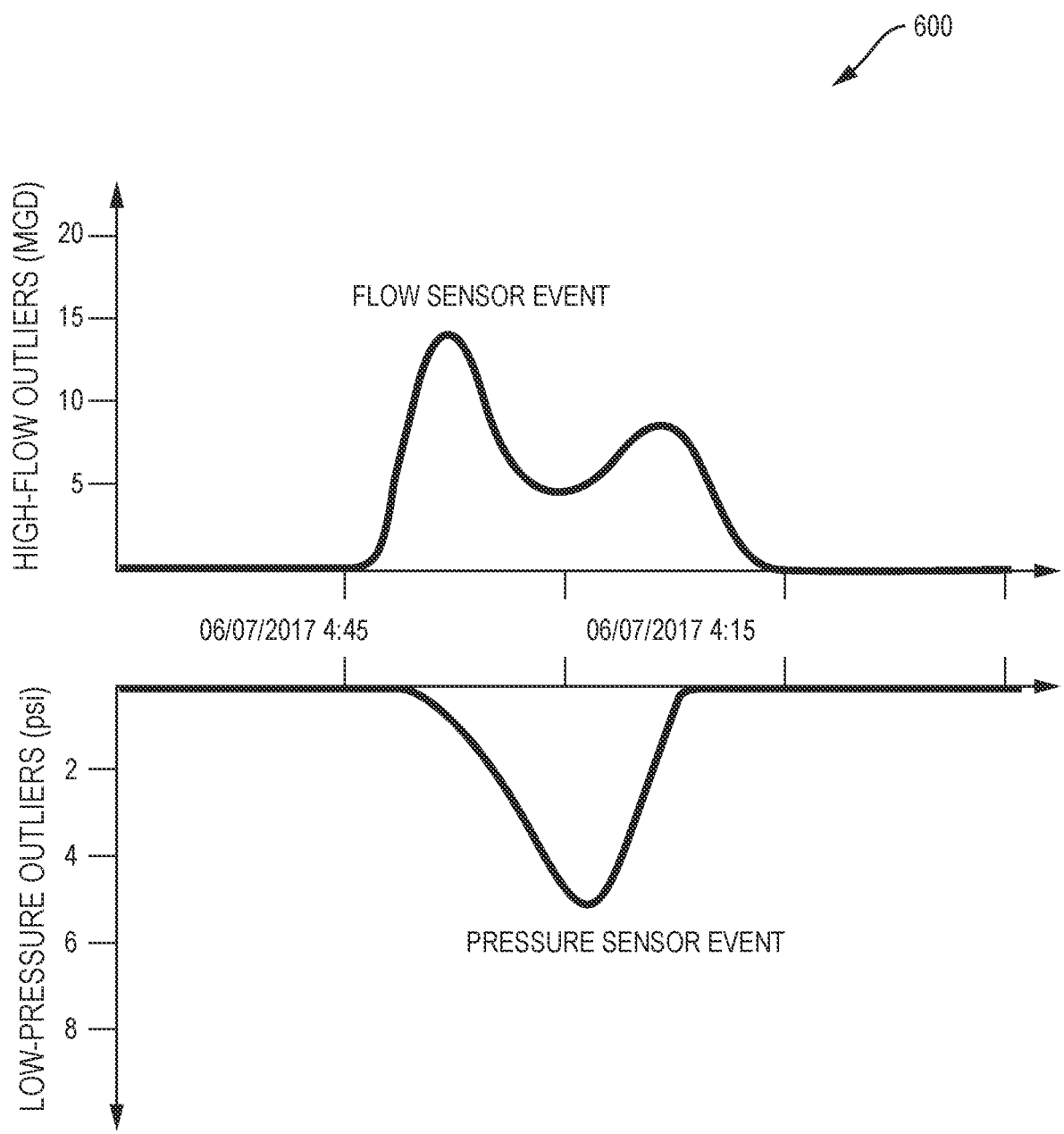
FIG. 6 is a pair of graphs showing a correlated HF sensor event and LP sensor event.

FIG. 6 is a pair of graphs 600 showing a correlated HF sensor event and LP sensor event. As can be observed, flow spikes and pressure drops within an approximately half-hour time window. While FIG. 6 shows a single correlated HF sensor event and LP sensor event, in a real water distribution system there may be many correlated HF sensor events and LP sensor events. The more correlated HF sensor events and LP sensor events in the same time window, the greater the confidence there is a true anomaly event. The system anomaly classification module 158 may classify an anomaly event when confidence exceeds a confidence threshold.

The anomaly classification module 158 may alternatively rely on clustering a plurality of sensor events (including HF sensor events and/or LP sensor events) in temporal proximity. Such clustering may be regardless of specific correlation between HF sensor events and LP sensor events. Assume $\hat{Q}_f(i)$ represent an HF sensor event at a flow sensor f at time step i and $\hat{P}_k(j)$ represents a LP sensor event at a pressure sensor k at time step j. All the HF sensor events and LP sensor events may be treated together. An anomaly event is then defined by a cluster of HF sensor events and/or LP sensor events within temporal proximity. Temporal proximity may be defined by comparing a time difference between adjacent sensor events (HF or LP) to a configured time gap $\Delta t$, which may be a few time steps. For example, if the time series data is in time steps of 15 minutes, time gap $\Delta t$ may be specified as 2- or 3-time steps (i.e., 30 or 45 minutes). The time gap value may be fine-tuned to improve accuracy of anomaly event classification by comparing detected anomaly events with field reported data.

At workflow step 270, the evaluation module 160 of the application 140 determines a quantitative score for each of the detected anomaly events that indicates a level of significance or importance. For example, each anomaly event may be evaluated with a score based on the density of sensor events in the anomaly event and the spread of the sensor events. As used herein "spread of the sensor events" for an anomaly event refers to a duration of the anomaly event, for example, the time difference between an earliest identified sensor event of the anomaly event and a last identified sensor event of the anomaly event. Such duration may be noted as $\Delta T_n$ for an anomaly event n. As used herein "density of sensor events" for an anomaly event refers to a ratio of a total number of sensor events to a number of data records with the anomaly event's duration. For example, a HF sensor event density for event n within duration $\Delta T_n$ for an anomaly event n may be given as:

$$D_q(n) = \frac{Nq_{out}(n)}{N_p(n) \times N_{fs}}$$

where $N_p(n)$ is the total number of flow data records for the anomaly event n, $N_{fs}$ is the number of flow sensors and $Nq_{out}(n)$ is the number of HF sensor events for anomaly event n within duration $\Delta T_n$. Similarly, a LP sensor event density for event n within duration $\Delta T_n$ for an anomaly event n may be given as:

$$D_p(n) = \frac{Np_{out}(n)}{N_p(n) \times N_{ps}}$$

where $Np_{out}(n)$ is the total number of LP sensor events among all pressure sensors, $N_p(n)$ is the number of pressure data records per pressure sensor over the duration $\Delta T_n$ and $N_{ps}$ is the number of pressure sensors.

Both $D_q(n)$ and $D_p(n)$ typically will be in a range between 0 and 1. The score S for an anomaly event n may be given as:

$$S(n) = [D_q(n) \times w_q + D_p(n) \times w_p] \frac{\Delta T_n}{\Delta T_{sp}}$$

where $w_q$ and $w_p$ are weighting coefficients and $\Delta T_{sp}$ is a minimum effective event spread (e.g., in minutes or hours) over which an anomaly event is highly trusted. The weighting coefficients may be either user-configured respectively for flow and pressure contributions or calculated as average values of HF and LP sensor events within a cluster. The minimum effective event spread $\Delta T_{sp}$ may be determined based on data records of historical events for a water distribution system. In general, a true anomaly event is expected to generate a cluster of outliers over an extended period of time (e.g., at least 60 minutes). The greater the minimum effective event spread, the smaller the score for the anomaly event.

The value of minimum effective event spread may be adjusted to produce a meaningful score. As may be observed in the equation above, the score S of an anomaly event may be proportional to the outlier density, the weighted contribution of HF and LP sensor events, and the ratio of the event spread to the minimum effective event spread. When the event duration is less than the minimum effective event spread, the score will be less than 1; otherwise, the score will be greater than one. A greater sensor event density with longer duration usually leads to a more likely true positive and/or more sever anomaly event than those with sparse sensor density in a shorter duration. Therefore, the greater the score, the more significant or important the anomaly event.

Although the event score as described above can be used as a good quantitative criteria for indicating whether the event requires an immediate dispatch of personnel or can be investigated in the normal course of maintenance (or potentially even ignored), it may have some limitations. For example, it may not capture the importance of repeated anomaly events within a time window (e.g., within a 48-hour time window). In general, the more anomaly events detected in the time window prior to a current anomaly event, the more likely the current anomaly event is a true and significant anomaly event. One way to quantify the impact of anomaly events prior to a currently detected anomaly event is to calculate an accumulative score. For example, for anomaly event n an accumulative score AccuS may be calculated as:

$$AccuS(n) = \sum_{m=n}^{m=n-l} S(m)$$

where S(m) is an individual score of anomaly event m detected prior to a current anomaly event n, and l is a number of anomaly events detected within a prescribed time window before event n.

At workflow step 280, the application 140 provides at least the detected anomaly events and their respective quantitative scores. For example, the user interface module 162 of the application 140 may display an indication of each detected anomaly event and its score on the display screen 132. Alternatively, or additionally, the application 140 may store an indication of each detected anomaly event and its score to memory 120/storage device 136 for later use by the application 140, or by other applications executing on the computing device 100 or other devices in communication therewith.

It should be understood that various adaptations and modifications may be readily made to what is described above to suit various implementations and environments. While it is discussed above that many aspects of the techniques may be implemented by specific software modules executing on hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for detecting and evaluating anomaly events in a water distribution system, comprising:
   receiving, by an application executing on one or more computing devices, time series data that includes both flow and pressure measurements at a plurality of time steps from one or more sensors of the water distribution system;
   decomposing, by a decomposition algorithm of the application, the time series data to remove seasonality and render the time series data stationary;
   detecting, by one or more statistical process control (SPC) algorithms of the application, outliers of the stationary time series data;
   classifying, by the application, sensor events in response to flow or pressure of detected outliers exceeding high or low thresholds for at least a given number of time steps;
   classifying, by the application, anomaly events by correlating one or more sensor events related to flow with one or more sensor events related to pressure;
   determining, by the application, a quantitative score for each of the detected anomaly events that indicates a level of significance or importance; and
   providing, by the application, at least the detected anomaly events and their respective quantitative scores.

2. The method of claim 1, further comprising:
   cleaning, by the application, the time series data to correct data errors including at least one data error selected from the group consisting of missing time steps, duplicate time steps, irregular time steps and sensor failure time steps.

3. The method of claim 1, wherein the decomposition algorithm is an improved Seasonal-Trend decomposition using LOESS (STL) algorithm that subtracts a seasonal component and a median value for the time series data from original values of the time series data.

4. The method of claim 1, wherein the one or more SPC algorithms comprise an x-bar algorithm.

5. The method of claim 1, wherein the one or more SPC algorithms comprise a cumulative sum control chart (CUSUM) algorithm.

6. The method of claim 1, wherein the one or more SPC algorithms comprise an exponentially weighted moving average (EWMA) algorithm.

7. The method of claim 1, wherein the one or more SPC algorithms comprise a seasonal hybrid-extreme student deviate (SH-ESD) algorithm.

8. The method of claim 1, wherein classifying sensor events further comprises:
   identifying at least high flow (HF) sensor events by comparing flow measurements to a HF threshold and identifying low pressure (LP) sensor events by comparing pressure measurements to a LP threshold.

9. The method of claim 1, wherein the classifying sensor events further comprises:
   combining two sensor events into a single sensor event when the two sensor events are associated with time steps less than a predetermined time gap.

10. The method of claim 1, wherein the classifying anomaly events correlates one or more high flow (HF) sensor events with one or more low pressure (LP) sensor events.

11. The method of claim 1, wherein the determining the quantitative score further comprises:
    calculating the quantitative score based on a density of sensor events for the anomaly event and a spread of the sensor events for the anomaly event.

12. A non-transitory electronic device readable medium having instructions stored thereon that when executed on one or more processors of one or more electronic devices are operable to:
    receive time series data that includes both flow and pressure measurements at a plurality of time steps from one or more sensors of a water distribution system;
    detect, using a statistical process control (SPC) algorithm, outliers of the time series data;
    classify sensor events in response to flow or pressure of detected outliers exceeding high or low thresholds for at least a given number of time steps;
    classify anomaly events by correlating one or more sensor events related to flow with one or more sensor events related to pressure;
    determine a quantitative score for each of the detected anomaly events that indicates a level of significance or importance based on a density of sensor events for the anomaly event and a spread of the sensor events for the anomaly event; and
    provide at least the detected anomaly events and their respective quantitative scores.

13. The non-transitory electronic device readable medium of claim 12, wherein the instructions when executed are further operable to:
    clean the time series data to correct data errors including at least one data error selected from the group consisting of missing time steps, duplicate time steps, irregular time steps and sensor failure time steps.

14. The non-transitory electronic device readable medium of claim 12, wherein the instructions when executed are further operable to:
    decompose, using a decomposition algorithm, the time series data to remove seasonality and render the time series data stationary, wherein the decomposition algorithm is an improved Seasonal-Trend decomposition using LOESS (STL) algorithm that subtracts a seasonal component and a median value for the time series data from original values of the time series data.

15. The non-transitory electronic device readable medium of claim 12, wherein SPC algorithm is selected from the group consisting of an x-bar algorithm, a cumulative sum control chart (CUSUM) algorithm, an exponentially weighted moving average (EWMA) algorithm and a seasonal hybrid-extreme student deviate (SH-ESD) algorithm.

16. The non-transitory electronic device readable medium of claim 12, wherein the instructions when executed are further operable to:
identifying at least high flow (HF) sensor events by comparing flow measurements to a HF threshold and identifying low pressure (LP) sensor events by comparing pressure measurements to a LP threshold.

17. The non-transitory electronic device readable medium of claim 12, wherein the classification of anomaly events correlates one or more high flow (HF) sensor events with one or more low pressure (LP) sensor events or clusters one or more HF sensor events and one or more LP sensor events that occur within a time window.

18. The non-transitory electronic device readable medium of claim 12, wherein the instructions when executed are further operable to:
calculate the quantitative score based on a density of sensor events for the anomaly event and a spread of the sensor events for the anomaly event.

19. A method for detecting and evaluating anomaly events in a water distribution system, comprising:
using one or more sensors of the water distribution system to collect time series data that includes both flow and pressure measurements at a plurality of time steps;
decomposing, by a decomposition algorithm of an application executing on one or more computing devices, the time series data to remove seasonality and render the time series data stationary;
detecting, by one or more statistical process control (SPC) algorithms of the application, outliers of the stationary time series data;
classifying, by the application, sensor events in response to flow or pressure of detected outliers exceeding high or low thresholds for at least a given number of time steps;
classifying, by the application, anomaly events by correlating one or more sensor events related to flow with one or more sensor events related to pressure; and
based on the classification of at least one anomaly event, deploying maintenance or repair personnel to the at least one anomaly event.

20. The method of claim 19, wherein classifying sensor events further comprises:
identifying, by the application, at least high flow (HF) sensor events by comparing flow measurements to a HF threshold and identifying low pressure (LP) sensor events by comparing pressure measurements to a LP threshold.

21. The method of claim 19, wherein the classifying anomaly events correlates one or more high flow (HF) sensor events with one or more low pressure (LP) sensor events.

22. The method of claim 19, further comprising:
cleaning, by the application, the time series data to correct data errors including at least one data error selected from the group consisting of missing time steps, duplicate time steps, irregular time steps and sensor failure time steps.

23. The method of claim 19, wherein the decomposition algorithm is an improved Seasonal-Trend decomposition using LOESS (STL) algorithm that subtracts a seasonal component and a median value for the time series data from original values of the time series data.

24. The method of claim 19 wherein the one or more SPC algorithms comprise an x-bar algorithm, a cumulative sum control chart (CUSUM) algorithm, an exponentially weighted moving average (EWMA) algorithm or a seasonal hybrid-extreme student deviate (SH-ESD) algorithm.

\* \* \* \* \*